United States Patent [19]

Köppl

[11] Patent Number: 4,467,221

[45] Date of Patent: Aug. 21, 1984

[54] SWITCHING NETWORK PARTICULARLY FOR HIGH VOLTAGE SUPPLY SYSTEMS

[75] Inventor: Georg Köppl, Birr, Switzerland

[73] Assignee: BBC Brown, Boveri & Company, Limited, Baden, Switzerland

[21] Appl. No.: 412,245

[22] Filed: Aug. 27, 1982

[30] Foreign Application Priority Data

Sep. 30, 1981 [CH] Switzerland ................. 6295/81

[51] Int. Cl.³ ............................................. H02B 1/24
[52] U.S. Cl. ....................................... 307/112; 307/19; 307/86
[58] Field of Search .................... 307/11, 12, 13, 18, 307/42, 29, 85, 112, 113, 132 R, 147; 361/62

[56] References Cited

U.S. PATENT DOCUMENTS 3,887,821 6/1975 Stipcevich ..................... 307/85 X
4,247,787 1/1981 Page ............................... 307/42 X

*Primary Examiner*—E. A. Goldberg
*Assistant Examiner*—Derek Jennings
*Attorney, Agent, or Firm*—Burns, Doane, Swecker & Mathis

[57] ABSTRACT

A switching network has at least four nodes which can be connected in each case via three interruptable current branches to other ones of the nodes. These nodes can be connected in at least two partial rings. In order to retain the redundancy of such a system in the case of an expansion to more than four nodes with negligible equipment expenditure and, at the same time, little space requirement, the partial rings are constructed in such a manner that they do not have a common node in a preferred embodiment. In this arrangement, each node of a first one of the two partial rings can be connected to a node of a second one of the two partial rings and, conversely, each node of this partial ring can be connected to a node of the first partial ring. The switching network can be advantageously used, in particular, in high-voltage supply systems.

5 Claims, 9 Drawing Figures

SWITCHING NETWORK PARTICULARLY FOR HIGH VOLTAGE SUPPLY SYSTEMS

BACKGROUND OF THE INVENTION

The present invention relates to switching networks of the type in which each of at least four nodes can be connected to every other node in the system by an interruptable current branch.

Such a switching network is disclosed, for example, in U.S. Pat. No. 4,247,787. In networks such as this, four nodes are provided, each of which is connected via an interruptable current branch to each of the remaining three nodes. The six interruptable current branches required for this purpose connect the four nodes in four partial rings, each of which is provided with three nodes. In each case any two partial rings have two nodes in common. Since each node can be connected to or isolated from three different nodes via three different current branches, in the case of a failure of a switching system provided in one of the current branches, two further intact current branches still remain which ensure that the node affected by the failure of the switching system is connected to the other nodes. If thereafter one of the switching systems provided in the two current branches fails, the supply of current to the affected node is guaranteed because of the functional reliability of the third remaining switching system. However, such networks can only be expanded with a relatively large expenditure or with considerable loss of redundancy and, in this form, lead to complex network structures which are difficult to understand.

OBJECT AND BRIEF SUMMARY OF THE INVENTION

For this reason, it is the object of the present invention to develop a switching network of the previously mentioned type such that, in the case of expansion, its redundancy is improved with little expenditure in equipment and with little space requirements and, at the same time, a simple network configuration is made possible that is easy to understand.

This object is achieved in one form of the invention by arranging the network with at least two partial rings that have mutually exclusive nodes. Each node of each partial ring is connected to at least one node of the other partial ring.

In another form of the invention, at least five nodes are connected in the form of a ring. In addition to the two nodes immediately adjacent it, each node is connected to one other node, with at most one of the nodes being connected to two such other nodes.

Such switching networks are characterized by great clarity of layout and a particularly simple expandability, which can be carried out by employing minimal mechanical parts whilst simultaneously retaining high redundancy.

BRIEF DESCRIPTION OF THE DRAWINGS

In the text which follows, illustrative embodiments of the invention are represented in a simplified form with the aid of the drawings, in which.

DETAILED DESCRIPTION

Figure 1:
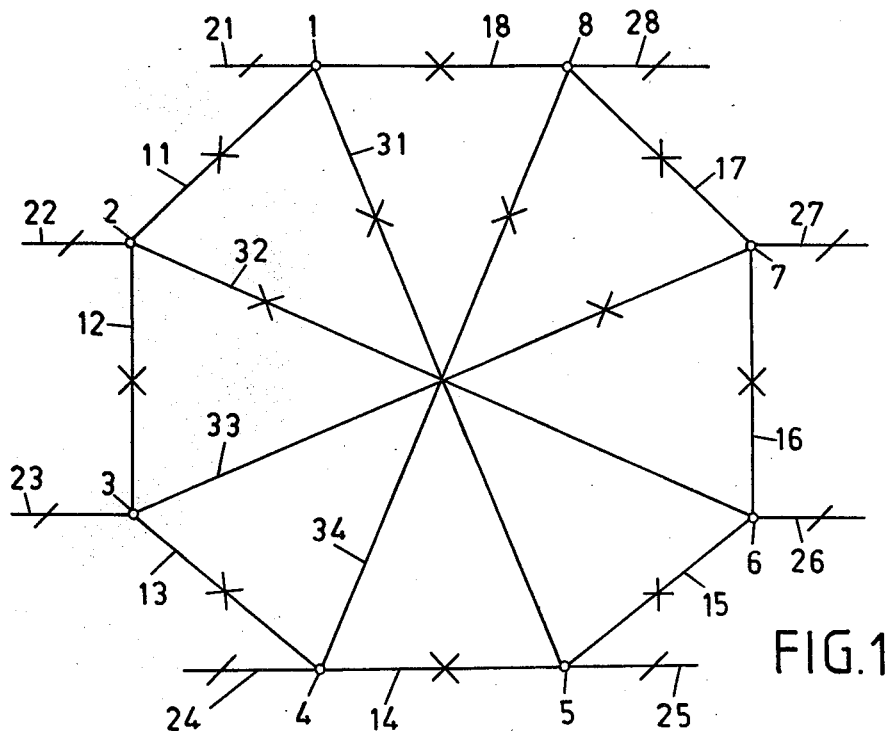
FIG. 1 is a circuit diagram of a switching system according to the invention, in which nodes connected in the form of a ring are connected to each other via current branches that are arranged in the form of a star.

Identical parts have been provided with identical reference symbols in all figures. The circuit diagram shown in FIG. 1 of a first embodiment of a switching network according to the invention has nodes 1 to 8. These nodes are connected in the form of a ring and numbered successively along the periphery of the ring. Each of the nodes 1 to 8 is connected to the two adjacent nodes by means of two of the current branches 11 to 18.

One switching system is provided in each of the current branches 11 to 18 and is marked by a cross. Each switching system can comprise a series circuit of a first isolating switch and a power switch, a current transformer and a second isolating switch. Current taps and feeds 21 to 28, i.e. load and source lines, are provided at the nodes 1 to 8. Each current tap line and each current feed line, respectively, includes an isolating switch, which is designated symbolically by means of a diagonal line. If necessary, an overvoltage arrester and a grounding switch can also be included in each current tap or feed line.

In addition, the nodes 1 to 8 can be connected via current branches 31 to 34. These current branches have switching systems which are marked by a cross and which can be configured in a manner analogous to the switching systems provided in the ring current branches 11 to 18. If their associated switching systems are actuated, each current branch 31 to 34 connects two nodes which are opposite to each other in the circuit with respect to the center point of the ring. In other words, they are arranged in the form of a star. In this case the nodes can be connected to form a first partial ring which, for example, has the nodes 1, 2, 6, 7, 8 and to form a second partial ring which, for example, has the nodes 3, 4, 5, 6, 7.

Such a network functions as follows:

In the normal operating condition of the switching network, the switching systems arranged in the current branches 11 to 18 of the ring will be closed and the switching systems located in the current branches 31 to 34 will be open. This prevents three switches each from being actuated in the event of a fault on one line.

In the event of a continuing fault at a node, two overlapping partial rings having great redundancy can be formed by closing two switching systems which are provided in the current branches arranged in the form of a star and which are associated with the nodes adjacent to the node which is not available. If, for example, node 1 is not available, the switching systems provided in the current branches 32 and 34 are closed and partial rings are formed which have the nodes 2, 3, 4, 5, 6 and 4, 5, 6, 7, 8, respectively.

Figure 9:
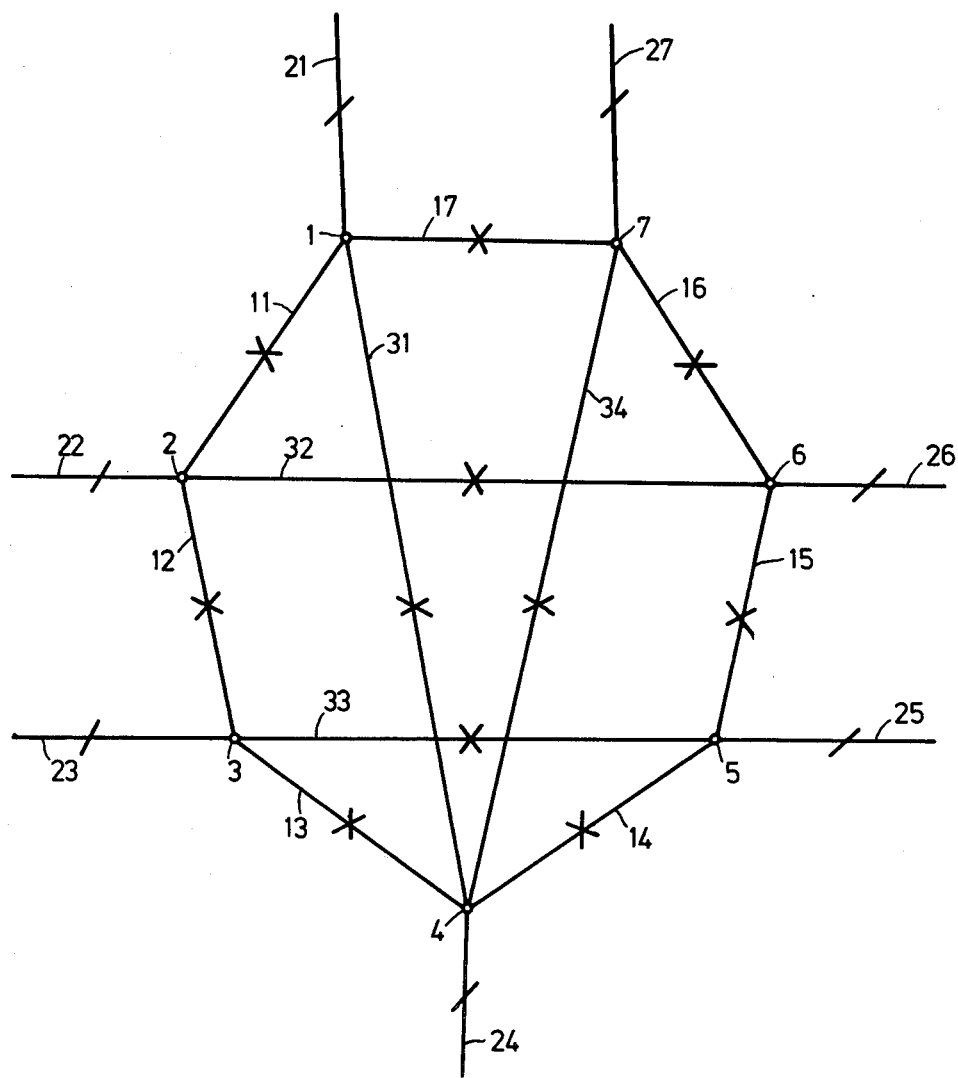
FIG. 9 is a circuit diagram similar to the embodiment of FIG. 2, illustrating the case in which there are an odd number of nodes in the network.

In the case of an even number n of nodes the switching network need only $n+n/2$ power switches and $4n$ isolating switches. In the case of an odd number m of nodes, $m+(m+1)/2$ power switches and $4m+1$ isolating switches are needed. In such a case, one and only one node would be connected to two current branches similar to current branches 31–34, as shown in FIG. 9.

Since each node can be connected to the other nodes in the ring via at least three power switches which are arranged in parallel, such a switching network has high redundancey even after expansion to more than five nodes. A further advantage lies in the fact that, in the event of a failure of a current branch and additional non-availability of an optical node, overlapping partial rings can be formed which, in turn, have high redundancy. Corresponding factors apply for the non-availability of two optional nodes. Where the number of nodes $n>6$, at least one partial ring can be formed which guarantees high supply reliability.

Figure 2:
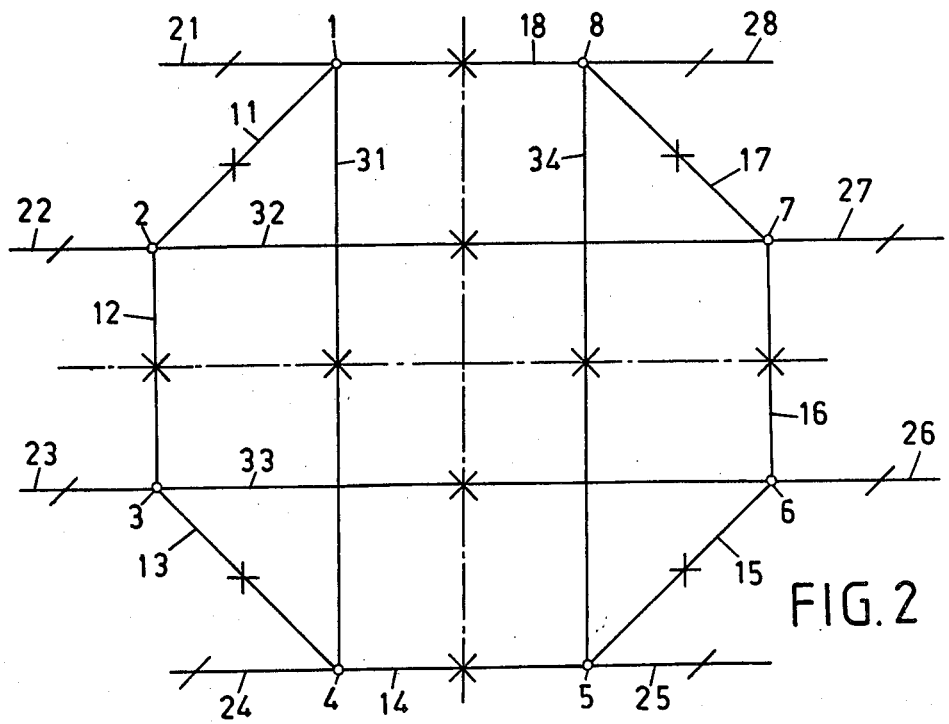
FIG. 2 is a circuit diagram of a switching system according to the invention, in which nodes connected in the form of a ring are connected to each other via current branches that are arranged in the form of a cross.

In the embodiment of the switching network represented in FIG. 2, the Lcujrenm branches 31 to 34 are arranged between nodes 1 to 8 which are located on parallel lines that run on both sides of perpendicular center point axes of the ring. This network differs from the network of FIG. 1 by the fact that a first partial ring, comprising for example the nodes 1, 2, 7 and 8, and a second partial ring, comprising for example, the nodes 3, 4, 5 and 6, are provided which do not have a common node. Each node of the first partial ring is connected to at least one node of the second partial ring, and conversely, each node of the second partial ring is connected to at least one node of the first partial ring via interruptable current branches, for example 12, 16, 31 and 34 (cross form).

Figure 3:
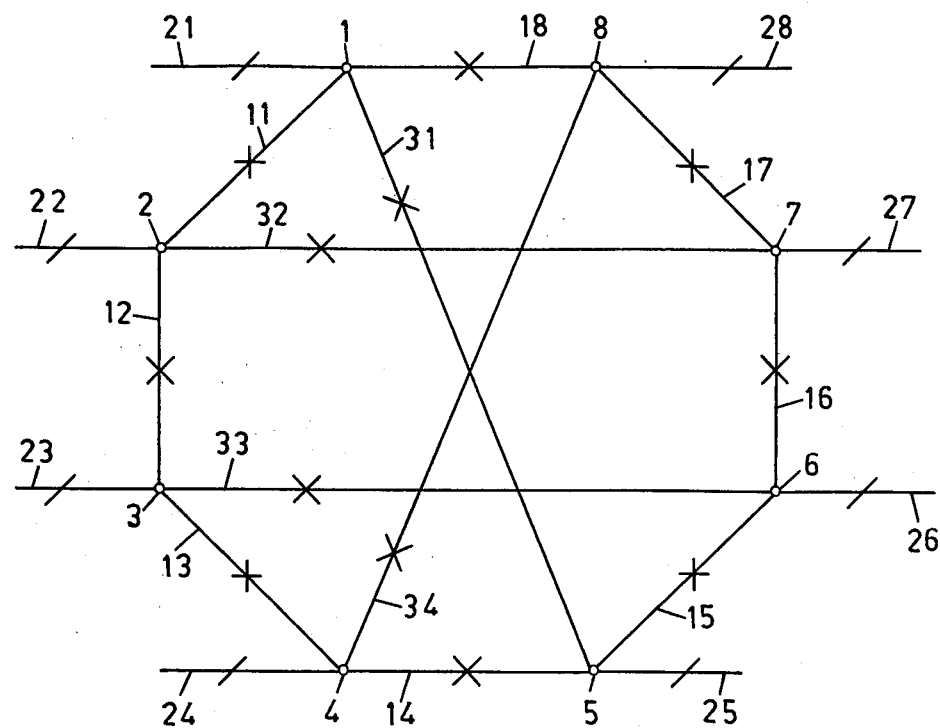
FIG. 3 is a circuit diagram of a switching system according to the invention, in which nodes connected in the form of a ring are connected to each other via current branches that are arranged partially in the form of a star and partially in parallel.

In the embodiment of a switching network represented in FIG. 3 the current branches 31 to 34 are arranged partly in the shape of a star and partly in parallel form.

Figure 4:
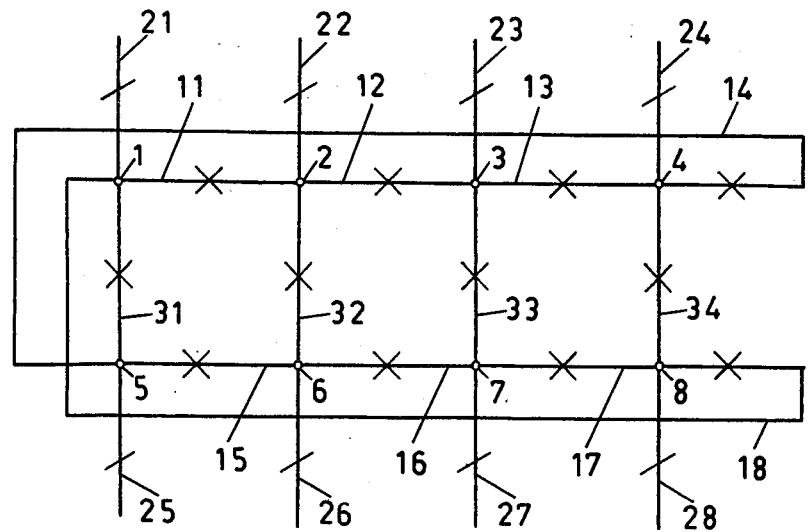
FIG. 4 is a top view of the spatial arrangement of the nodes and current branches of the switching network according to FIG. 1.
Figure 5:
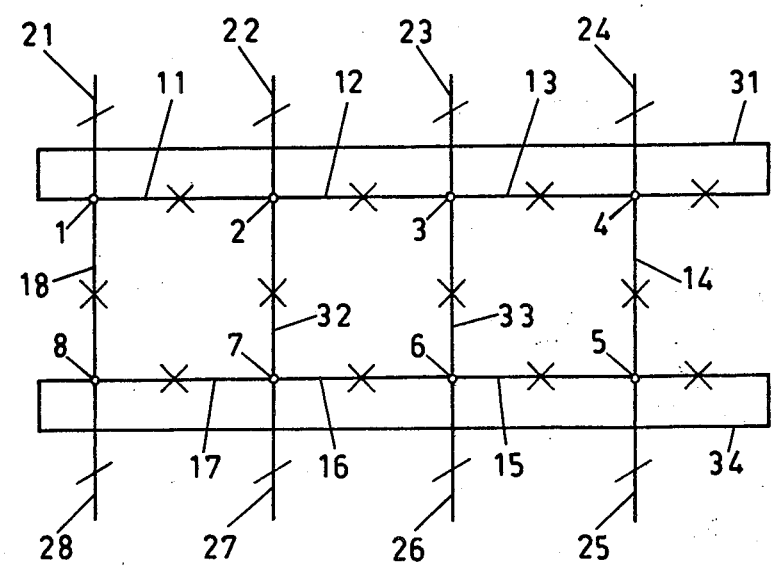
FIG. 5 is a top view of the spatial arrangement of the nodes and current branches of the switching network according to FIG. 2.
Figure 6:
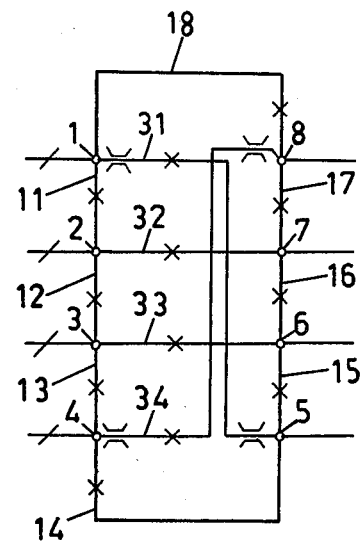
FIG. 6 is a top view of the spatial arrangement of the nodes and current branches of the switching network according to FIG. 3.

In FIGS. 4 to 6, preferred spatial arrangements of the nodes and current branches of the switching networks according to the invention are shown. In these arrangements, the nodes are arranged on the long sides of a rectangular field which is defined by the current branches 11 to 18. Such arrangements have the advantage that they can be installed in a simple manner since the nodes are arranged, for example, along parallel lines with respect to one another. Each of the nodes on one side of the field can be connected to the node on the opposite side of the field that is the shortest distance from it by means of a current branch which is at a right angle to these parallel lines when an even number of nodes are present. Such switching networks, which are shown for example in FIGS. 4 and 5, are particularly clearly laid out and, in addition, can be implemented and expanded in a particularly cost effective manner because of their compact configuration.

The networks shown in FIGS. 4 and 6 can be constructed by using conventional high-voltage switches, transformers and isolating switches which are connected to each other via conductor cables or tubes. Alternatively, they can be provided with encapsulated, gas-insulated switching systems and connecting lines or completely constructed as gas-insulated switching networks.

Figure 7:
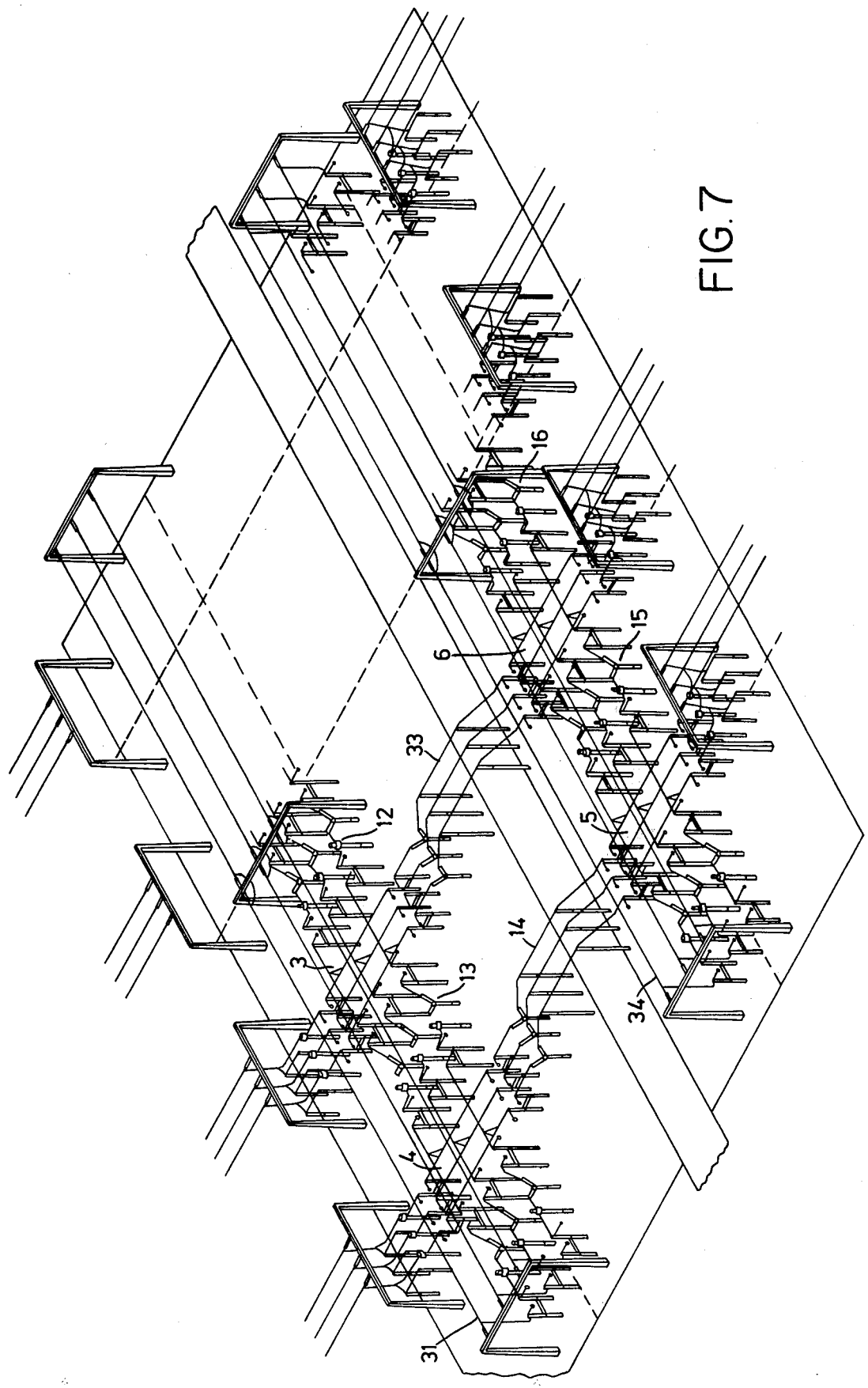
FIG. 7 is a perspective view of the switching network according to FIG. 5, in which the design details of the nodes and current branches are represented.

FIG. 7 illustrates a perspective view of an outdoor switching network according to FIGS. 2 and 5 having eight nodes. This switching network is constructed as a three-phase network and, accordingly, has nodes 1 to 8 for each phase. Of the current branches, only 12, 13, 14, 15, 16 and 31, 33, 34 are designated. All current branches have first isolating switches, power switches and second isolating switches (not marked). The individual components are preferably connected by means of tubular rails, with the exception of the current branches 31 and 34 which are constructed as cable traverses. In order to be able to keep the structure of the switching network extremely low, the current branches 31 and 34 can be constructed as cable connections or as tubular $SF_6$ gas cables.

Figure 8:
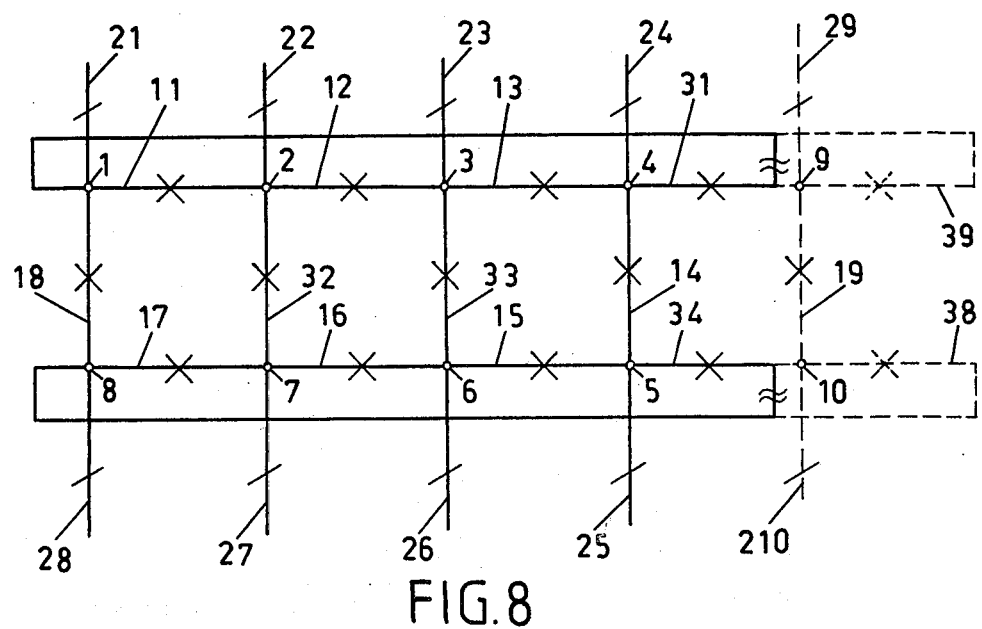
FIG. 8 is a switching network according to FIG. 5, at the end of which two further nodes are additionally installed.

FIG. 8 shows a switching network according to FIG. 5 at the end of which additional nodes 9 and 10, for example an additional feed and tap, are to be installed. These nodes can be installed in a simple manner in the network illustrated in FIG. 5. To accomplish this, the current branches 31 and 34 are opened and the nodes 4 and 9, and 5 and 10, respectively, are connected via the switching systems associated with these current branches. After that, current branches 39 and 38 are established between the nodes 1 and 9, and 8 and 10, respectively, and the current branch 19 is installed between the nodes 9 and 10.

The present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalency of the claims are therefore intended to be embraced therein.

I claim:

1. A switching network having at least four nodes connected to each other via interruptable current branches wherein at least two nodes can be connected by closing a first set of the current branches to form a first partial ring and at least two other nodes can be connected by closing a second set of the current branches to form a second partial ring wherein all of the nodes and current branches contained in each of said first and second partial rings are mutually exclusive of the nodes and current branches, respectively, of the other partial ring, and further wherein each node of the first partial ring is connected to at least one node of the second partial ring and each node of the second partial ring is connected to at least one node of the first partial ring by at least one interruptable current branch in a third set which is exclusive of the current branches in said first and second sets of current branches.

2. The switching network of claim 1, wherein the number of nodes in the first partial ring is identical to the number of nodes in the second partial ring and further wherein the number of current branches in said third set is identical to the number of nodes provided in each of the two partial rings.

3. A switching network having at least five nodes, first interruptable current branches connecting the nodes in the form of a ring such that each node is connected to each of two adjacent nodes in the ring, and second interruptable current branches connecting each node to at least one node other than the two adjacent nodes in the ring, wherein at most one of the nodes is connected to two nonadjacent nodes by two of said second current branches.

4. The switching network of claim 3 comprising an even number of nodes which are uniformly distributed around the periphery of the ring and wherein second current branches are connected between nodes which are located opposite to one another with respect to the center point of the ring.

5. The switching network of claim 1, 2, 3 or 4 wherein the nodes are arranged on the longer sides of a rectangular field defined by some of said current branches and wherein each node on one side of the field is connected by one of said current branches to the node on the opposite side of the field that is the shortest distance from it.

* * * * *